US 12,293,057 B2

(12) United States Patent
Peythieux

(10) Patent No.: US 12,293,057 B2
(45) Date of Patent: May 6, 2025

(54) COMPUTER-IMPLEMENTED METHOD FOR SELECTING AN ITEM FROM A LIST

(71) Applicant: Dassault Systèmes, Velizy Villacoublay (FR)

(72) Inventor: Laura Peythieux, Vélizy-Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 16/597,601

(22) Filed: Oct. 9, 2019

(65) Prior Publication Data
US 2020/0125219 A1    Apr. 23, 2020

(30) Foreign Application Priority Data

Oct. 18, 2018 (EP) .................................. 18306366

(51) Int. Cl.
  *G06F 3/048*     (2013.01)
  *G06F 3/0482*    (2013.01)
  *G06F 3/0486*    (2013.01)
(52) U.S. Cl.
  CPC .......... *G06F 3/0482* (2013.01); *G06F 3/0486* (2013.01)
(58) Field of Classification Search
  CPC ...... G06F 9/451; G06F 3/0482; G06F 3/0486; G06F 3/04817
  See application file for complete search history.

(56) References Cited

U.S. PATENT DOCUMENTS

| | | | | |
|---|---|---|---|---|
| 5,761,610 A | * | 6/1998 | Sorensen | H04M 1/2747 455/558 |
| 6,121,968 A | * | 9/2000 | Arcuri | G06F 3/0482 715/825 |
| 6,133,915 A | | 10/2000 | Arcuri et al. | |

(Continued)

FOREIGN PATENT DOCUMENTS

| | | |
|---|---|---|
| CN | 1123996 A | 6/1996 |
| CN | 1308474 A | 8/2001 |

(Continued)

OTHER PUBLICATIONS

European Search Report for European Application No. EP 18306366.8, titled: Computer-Implemented Method for Selecting an Item From a List, Date Mailed: Apr. 8, 2019.

(Continued)

*Primary Examiner* — Aleksey Olshannikov
(74) *Attorney, Agent, or Firm* — Hamilton, Brook, Smith & Reynolds, P.C.

(57) ABSTRACT

A computer-implemented method for selecting an item from a list in a user interface. The method receives a first input from a user. The first input comprises an interaction with an icon displayed on a computer screen. The interaction involves either a first action from the user or a second action from the user different from the first action. Next, if the first input involves the first action, the method displays on the computer screen a first menu comprising a subset of the items of the list. Otherwise, if the input involves the second action, the method displays on the computer screen a second menu comprising the whole list of items. Lastly, the method selects an item of the displayed menu upon receiving a second input from the user.

10 Claims, 2 Drawing Sheets

(56) References Cited

U.S. PATENT DOCUMENTS

| | | |
|---|---|---|
| 2001/0006388 A1 | 7/2001 | Kim et al. |
| 2003/0065673 A1* | 4/2003 | Grobler ............... G06F 16/24 |
| 2006/0218499 A1 | 9/2006 | Matthews et al. |
| 2009/0007009 A1 | 1/2009 | Luneau et al. |
| 2009/0172596 A1 | 7/2009 | Yamashita |
| 2009/0228831 A1 | 9/2009 | Wendker et al. |
| 2010/0221999 A1* | 9/2010 | Braun ............... H04M 1/72412 |
| | | 455/41.1 |
| 2012/0110514 A1* | 5/2012 | Trowbridge ......... G06F 9/5077 |
| | | 715/764 |
| 2014/0344696 A1* | 11/2014 | Koreeda ........... H04N 21/4858 |
| | | 715/719 |
| 2018/0206086 A1 | 7/2018 | Zhao |
| 2019/0129579 A1* | 5/2019 | Rendschmidt ......... G16H 50/30 |

FOREIGN PATENT DOCUMENTS

| | | | |
|---|---|---|---|
| CN | 108268190 A | | 7/2018 |
| EP | 1804153 A1 | | 7/2007 |
| JP | 2009-521762 A | | 6/2009 |
| JP | 2009-159197 A | | 7/2009 |
| JP | 2017-146712 A | | 8/2017 |
| JP | 2017-535865 A | | 11/2017 |
| WO | WO-2004017227 A1 * | 2/2004 | ......... G06F 3/04886 |

OTHER PUBLICATIONS

Gijutsu-Hyohron Co., Ltd., "How To Easily Use Windows 10 Right Now", 3rd revised edition, Jan. 9, 2018, 6 pages.

* cited by examiner

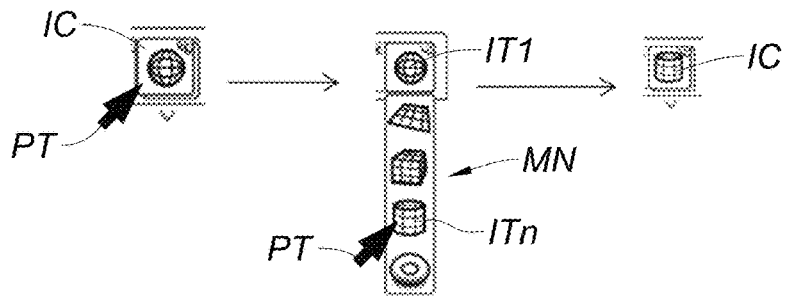
Fig. 1
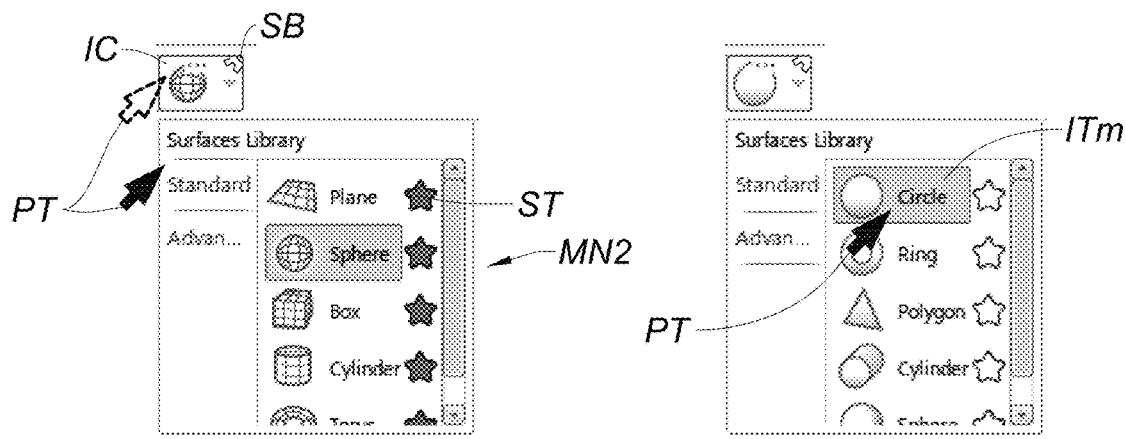
Fig. 2A
Fig. 2B
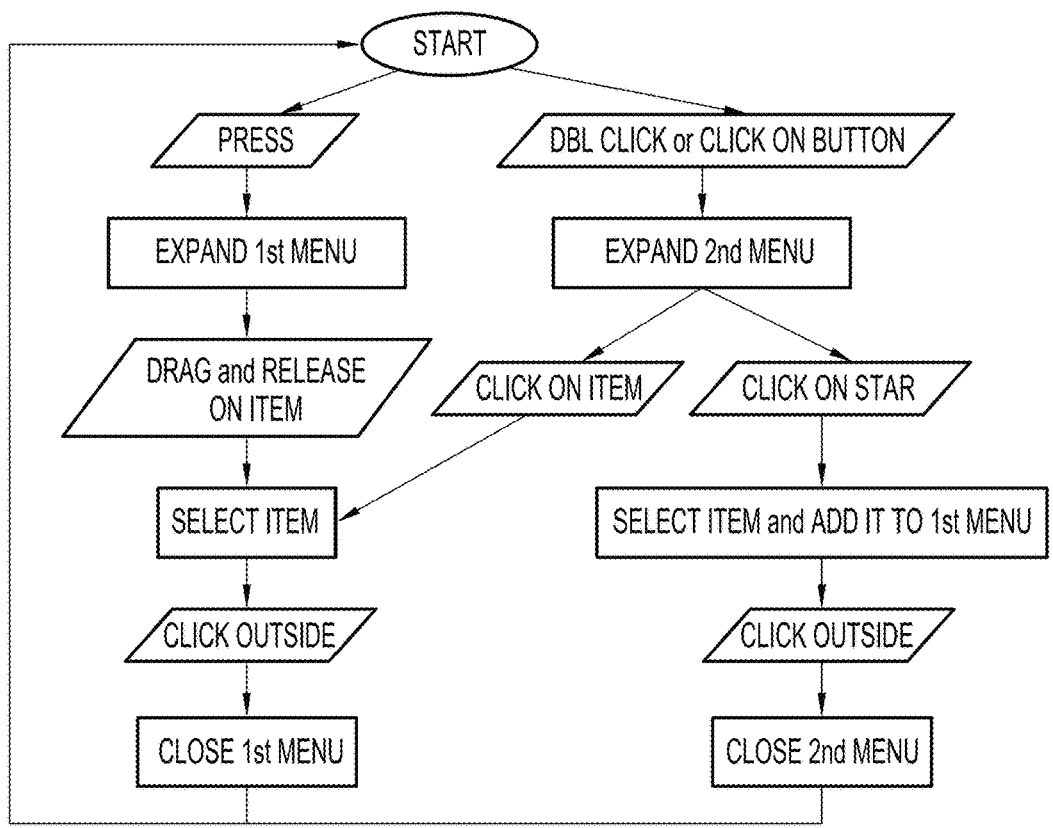
Fig. 3

COMPUTER-IMPLEMENTED METHOD FOR SELECTING AN ITEM FROM A LIST

RELATED APPLICATION(S)

This application claims priority under 35 U.S.C. § 119 or 365 to European Application No. 18306366.8, filed on Oct. 18, 2018. The entire teachings of the above application(s) are incorporated herein by reference.

FIELD OF THE INVENTION

The invention relates to a computer-implemented method for selecting an item from a list. It pertains to the technical field of computer engineering, and more particularly to that of Graphical User Interfaces (GUI). It leads itself to many different applications, such as computer graphics software, word processing, etc.

BACKGROUND

Very often, the user of a software tool has to choose an item from a list, or library. For instance, in the field of word processor, the user may need choosing a font; in computer graphics, a color, the thickness of a line, the size and shape of a brush, etc. The list may be very long, in order to offer the greatest possible freedom to the user, but this makes performing the choice—e.g. by scrolling across a drop-down menu, time consuming and cumbersome. Moreover, experience shows that most of the time the choice is performed among a small number of "favorite" items, a quick access to which is much desirable.

Several approaches have been implemented in order to allow a user to select an item from a list in the most efficient way, but none of them is fully satisfactory.

For instance, Microsoft Word provides quick access to a menu of preferred and recently used color, which is opened by clicking on an icon on a toolbar. However, several actions are required to select a color which does not belong to this menu. First of all, the user needs to click on an "Other color" button; this results in the closing of the menu and the opening of a new panel in the middle of the screen. The user then has to move the cursor to the new panel, select a new color among an extended set and confirm the choice by clicking on an "Ok" button. This is quite time consuming, and yet only provide a somehow limited choice of color—further customization is possible, but requires further actions from the user.

In other cases, only the full list is accessible. This either results in a large and intrusive menu, scrolling through which is very complex, or in a limited choice of non-customizable items.

A hierarchically-structured menu is another alternative, but several actions (e.g. clicks) may be necessary to select a single item.

SUMMARY

The invention aims at providing a quick access to favorite items, while also allowing the user to access the full item list with minimal burden.

An object of the present invention, allowing achieving this aim, is a computer-implemented method for selecting an item from a list, the method comprising the steps of:

a) receiving a first input from a user, the first input comprising an interaction with an icon displayed on a computer screen, said interaction involving either a first action from the user or a second action from the user, different from the first action;

b) if the first input involves the first action, displaying on the computer screen a first menu comprising a subset of the items of the list; otherwise, if the input involves the second action, displaying on the computer screen a second menu comprising the whole list of items; and c) selecting an item of the displayed menu upon receiving a second input from the user;

wherein the second input may involve either a third action performed by the user on the item to be selected or a fourth action performed by the user on the item to be selected, different from the third action, the method further comprising, if the second input involves the fourth action performed on an item of the second menu, adding said item to the subset of items of the first menu.

According to particular embodiments of the inventive method:

The first and second menu may be displayed on a same region of the computer screen, adjacent to or overlapping the icon.

The first and second input may be provided by the user through a pointing device. More particularly, the first action may be a press action performed on the icon using said pointing device, and when the first menu is displayed, said selecting an item may comprise a drag and release action performed on the item to be selected using said pointing device. Moreover, the second action may comprise either a double click or tap action on the icon performed using said pointing device, or a simple click or tap action on a specific region of the icon, also performed using said pointing device. The third and fourth actions may comprise click or tap actions on different predetermined regions of the item to be selected, performed using said pointing device.

Another object of the invention is a computer program product, stored on a non-volatile computer-readable data-storage medium, comprising computer-executable instructions to cause a computer system to carry out such a method.

Another object of the invention is a non-volatile computer-readable data-storage medium containing computer-executable instructions to cause a computer system to carry out such a method.

A further object of the invention is a computer system comprising a processor coupled to a memory and to graphical user interface devices, the memory storing computer-executable instructions to cause the computer system to carry out such a method.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

Additional features and advantages of the present invention will become apparent from the subsequent description, taken in conjunction with the accompanying drawings, which show:

FIG. 1, the displaying of a first menu of preferred items and the selection of one of said items, according to an embodiment of the invention;

FIGS. 2A and 2B, the displaying of a second menu showing all the available items and the selection of one of said items, according to an embodiment of the invention;

FIG. 3, a flow-chart of a method according to an embodiment of the invention;

DETAILED DESCRIPTION

Figure 4:
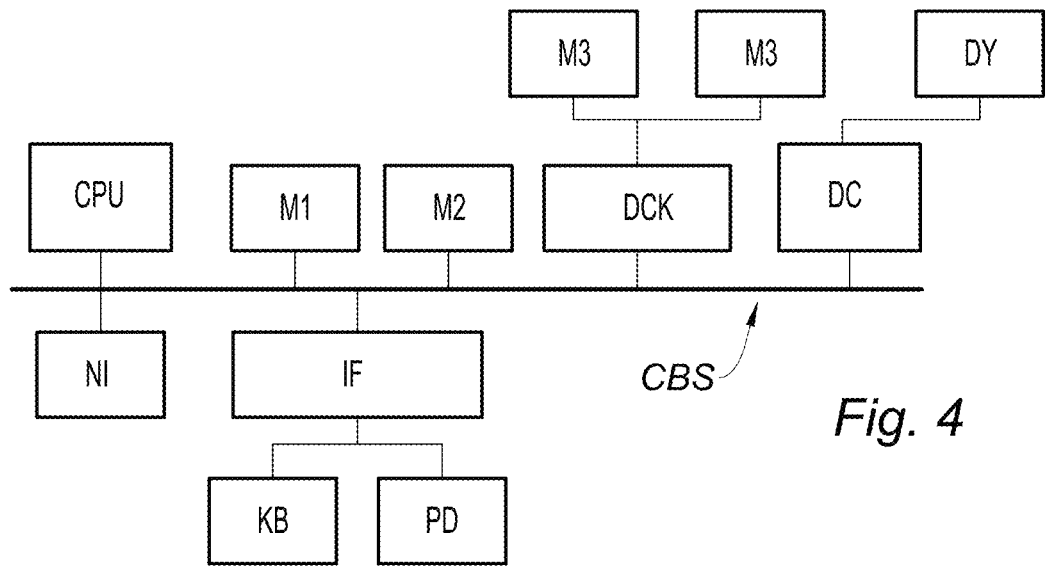
FIGS. 4 and 5, block diagrams of respective computer systems suitable for carrying out a method according to different embodiments of the invention.

A description of example embodiments follows.

In the following:

"Click" refers to an action consisting in pressing and immediately (typically within less one second or less) releasing a button of a pointing device such a mouse, joystick, track-ball or the like. If the pointing device has two buttons, the click is typically performed using the left one (the right one if a setting for left-handed people is used), unless the use of the right button is specified.

A "tap" refers to an action consisting in briefly touching a tactile pointing device such as a pad or touch-screen.

A "double click" or "double touch" refers to an action consisting in two "clicks" or two "touch" in close succession (typically within less one second or less).

A "press" refers to an action consisting in pressing a button of a pointing device such a mouse, joystick, track-ball or the like, or in touching a tactile pointing device such as a pad or touch-screen, without immediately releasing.

A "drag" refers to an action consisting in moving a pointer while keeping a button of the pointing device pressed. In the case of tactile pointing devices, pressing a button may be required for performing a press.

As illustrated on FIG. 1, an icon IC, displayed on a computer screen, provides an access to the list of items among which the selection has to be performed. Advantageously, but not necessarily, the icon includes a representation of a currently chosen item—in the example of FIG. 1, a spherical shape IT1.

A pointer PT, whose movements across the screen are controlled by a pointing device PD such as a mouse, a touch-screen or the like, allows a user to interact with the icon. The pointer may be missing if the pointing device can directly act onto the icon, e.g. it includes a touch-screen and/or a pen-like device.

An important feature of the invention is that the pointer device allows the user to interact with the icon IC by performing two different and mutually exclusive actions. For instance, a first action may be chosen among a left-button click on the icon, a tap, a press, and the second action may be chosen among a click or tap onto a specific area, or button, of the icon (reference SB on FIG. 2A), a right-button click, a double click, a double tap. These lists of actions are not limiting; the only stringent requirement is that the first and the second action are different from each other. Different embodiments of the invention will use a different first action and/or a different second action.

The first or the second actions constitute the first input provided by the user.

When the user interacts with the icon through the first action, a first menu MN1 is displayed alongside the icon or superposed to it. This first menu presents to the user a subset of the complete item list—i.e. the "favorite" items. The user may then choose one of these items using the pointer device. In the example of FIGS. 1 and 3 (left part), the first action consists in positioning the pointer PT on any part of the icon IC except button SB on its upper-right corner and performing a "press" with a button of the pointing device. The first menu MN1 is then expanded and shows a plurality of items—in this case, three-dimensional shapes. One of these shapes—IT1—is the currently-selected one (or the last one to have been selected) and is represented on the icon. The second input is provided by dragging the pointer on the item to be selected (ITn) while keeping the button pressed, then by releasing it. In some embodiment, a click may be required to confirm the selection. The menu is then closed by clicking outside it, or directly when the selection has been performed. The icon IC is changed to represent the newly-selected item.

When the user interacts with the icon through the second action, a second menu MN2 is displayed alongside the icon or superposed to it. This second menu presents to the user the complete item list, and may have a hierarchical structure. The user may then choose one of these items using the pointer device. In the example of FIGS. 2A, 2B and 3 (right part), the second action consists in positioning the pointer PT on button SB on the upper-right corner of the icon IC and performing a "click"; alternatively, a double-click or a right-button click on any point of the icon may be used as the second action. The second menu MN2 is then expanded. In the embodiment of FIGS. 2A, 2B, the menu is hierarchical: the list is divided in two parts, corresponding to "standard" and "advanced" shapes. "Standard" shapes are displayed by default (2A), as the lastly selected shape is one of them, but the user may select "advanced shapes" by clicking on the word "Advan . . . " on the left of the second menu.

A second input from the user allows then selecting an item (ITm). This selection may be performed through a third or a fourth action. For instance, the third action may consist in clicking on any point of the item (more exactly, of its graphical representation on the screen) except on a specific portion thereof (star-shaped button ST on FIGS. 2A and 2B), while the fourth action may consist in clicking on said specific portion. If the third action is performed, the item is selected; if the fourth action is performed, the item is selected and in addition it is added to the first menu, i.e. is labelled as a "preferred" item (on FIGS. 2A and 2B, a dark star denotes "preferred" items, a white one "non-preferred" ones). The menu is then closed by clicking outside it, or directly when the selection has been performed. The icon IC is changed to represent the newly-selected item.

The inventive method has several advantages compared to the prior art:

It allows a quick access to a subset of preferred items, the selection of one of which only requires two actions. Moreover, in the exemplary embodiment described above, the two actions are performed by a single "press—drag—release" gesture.

It also allows a quick access to the whole set of items, the "full" menu being expanded by a single action. The selection of a non-preferred item may also only require two actions, except if the second menu is hierarchical.

The customization of the list of preferred item is as simple as one click.

All the actions are performed by moving the pointer within a same region of the screen, near to the icon. Movements of e.g. a mouse are therefore minimized; so is the obstruction of the screen by the different menus.

This amounts to an optimized use of the resources of a computer screen.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

A computer system suitable for carrying out a method according to an exemplary embodiment of the present invention is described with reference to FIG. 4. In FIG. 4, the computer includes a Central Processing Unit CPU which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Moreover, one or more computer files defining the three-dimensional modelled object may also be stored on one or more of memory devices M1 to M4, or remotely.

The claimed invention is not limited by the form of the computer-readable media on which the computer-readable instructions and/or the digital files of the inventive process are stored. For example, the instructions and files can be stored on CDs, DVDs, in FLASH memory, RAM, ROM, PROM, EPROM, EEPROM, hard disk or any other information processing device with which the computer system communicates, such as a server or another computer. The program and the files can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft® Windows 8 or 10, UNIX, Solaris, LINUX, Apple MAC-OS and other systems known to those skilled in the art.

The Central Processing Unit CPU can be a Xenon processor from Intel of America or an Opteron processor from AMD of America, or can be other processor types, such as a Freescale ColdFire, IMX, or ARM processor from Freescale Corporation of America. Alternatively, the Central Processing Unit can be a processor such as a Core2 Duo from Intel Corporation of America, or can be implemented on an FPGA, ASIC, PLD or using discrete logic circuits, as one of ordinary skill in the art would recognize. Further, the Central Processing Unit can be implemented as multiple processors cooperatively working to perform the computer-readable instructions of the inventive processes described above.

The computer system in FIG. 8 also includes a network interface NI, such as an Intel Ethernet PRO network interface card from Intel Corporation of America, for interfacing with a network, such as a local area network (LAN), wide area network (WAN), the Internet and the like. The computer system further includes a display controller DC, such as a NVIDIA GeForce GTX graphics adaptor from NVIDIA Corporation of America for interfacing with display, or screen, DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces are user interface devices, used by the user to provide input commands—e.g. to move a pointer and/or perform an action such as a click, a press-and-release or the like—and by the computer system for displaying menus in a window.

Disk controller DKC connects HDD M3 and DVD/CD M4 with communication bus CBS, which can be an ISA, EISA, VESA, PCI, or similar, for interconnecting all of the components of the computer system.

A description of the general features and functionality of the display, keyboard, pointing device, as well as the display controller, disk controller, network interface and I/O interface is omitted herein for brevity as these features are known.

Figure 5:
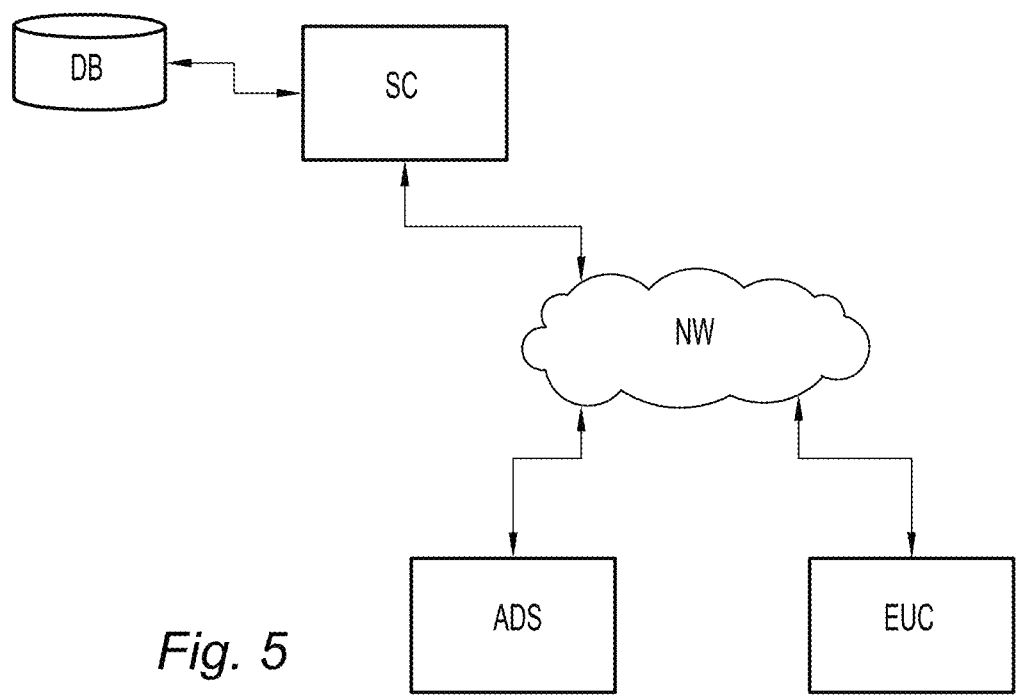

FIG. 5 is a block diagram of a computer system suitable for carrying out a method according to a different exemplary embodiment of the present invention.

In FIG. 5, the executable program EXP and the computer file(s) defining the item list are stored on memory devices connected to a server SC. The memory devices and the overall architecture of the server may be the same as discussed above with reference to FIG. 4, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 4, except that the memory devices of the administrator system and the end user computer do not store the executable program EXP and/or the computer file(s) defining the item list. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, the server SC which performs the processing as described above and transmits its results to the end user computer.

Although only one administrator system ADS and one end user system EUX are shown, the system can support any number of administrator systems and/or end user systems without limitation. Similarly, multiple servers can also be implemented in the system without departing from the scope of the present invention.

Any processes described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method for selecting and activating an item from a list, the method comprising the steps of:
   a) receiving a first input from a user, the first input being provided by the user through a pointing device (PD) and the first input comprising an interaction with an icon (IC) displayed on a computer screen (DY), said interaction involving either a press action performed on the icon using said pointing device or a double click on the icon using said pointing device;

b) if the first input involves the press action, displaying on the computer screen a first menu (MN1) comprising a subset of the items of the list; otherwise, if the first input involves the double click, displaying on the computer screen a second menu (MN2) comprising the whole list of items; and c) selecting and activating an item (ITn, ITm) of the displayed menu upon receiving a second input from the user;

wherein step c) comprises detecting whether the second input involves either a click action performed by the user on any point of the item to be selected except on a specific portion thereof, or a click action performed by the user on said specific portion, the method further comprising, (i) responsive to the second input involving the click action performed on said specific portion and the item being of the second menu, adding said item to the subset of items of the first menu in addition to activating the item, and (ii) responsive to the second input involving the click action performed on any point of the item to be selected except on said specific portion thereof, and the item being of the second menu, activating the item without adding it to the subset of items of the first menu;

wherein the specific portion is a predetermined region (ST) of the item to be selected and said predetermined region (ST) comprises a button, where the button is of a first type for items of the first menu (MN1) and the button is of a second type for items of the second menu (MN2), said first type and said second type being different from one another, said button being automatically updated upon detection of the second input when said second input involves the click action performed on said specific portion; and wherein, in the second menu (MN2), the button of the first type for items of the first menu (MN1) is displayed alongside with the items of the first menu (MN1) as long as the items of the first menu (MN1) are displayed, and the button of the second type for items of the second menu (MN2) are displayed alongside with the items of the second menu (MN2) as long as the items of the second menu (MN2) are displayed.

2. The computer-implemented method of claim 1, wherein the first and second menu are displayed on a same region of the computer screen, adjacent to or overlapping the icon.

3. The computer-implemented method of claim 1, wherein:
when the first menu is displayed, said selecting and activating an item comprises a drag and release action performed on the item to be selected using said pointing device.

4. The computer-implemented method of claim 1, wherein the click action performed by the user on any point of the item to be selected except the specific portion thereof and the click action performed by the user on said specific portion are performed using said pointing device.

5. A computer program product, comprising:
a non-transitory computer-readable data-storage medium (M1-M4); and
computer-executable instructions stored on the data-storage medium, at least some of the computer-executable instructions causing a computer system to select and activate an item from a list by:

a) receiving a first input from a user, the first input being provided by the user through a pointing device (PD) and the first input comprising an interaction with an icon (IC) displayed on a computer screen (DY), said interaction involving either a press action performed on the icon using said pointing device or a double click on the icon using said pointing device;

b) if the first input involves the press action, displaying on the computer screen a first menu (MN1) comprising a subset of the items of the list; otherwise, if the input involves the double click, displaying on the computer screen a second menu (MN2) comprising the whole list of items; and c) selecting and activating an item (ITn, ITm) of the displayed menu upon receiving a second input from the user;

wherein step c) comprises detecting whether the second input involves either a click action performed by the user on any point of the item to be selected except on a specific portion thereof, or a click action performed by the user on said specific portion, the at least some of the computer-executable instructions further causing the computer system, (i) responsive to the second input involving the click action performed on said specific portion and the item being of the second menu, to add said item to the subset of items of the first menu in addition to activating the item, and (ii) responsive to the second input involving the click action performed on any point of the item to be selected except on said specific portion thereof, and the item being of the second menu, to activate the item without adding it to the subset of items of the first menu;

wherein the specific portion is a predetermined region (ST) of the item to be selected and said predetermined region (ST) comprises a button, where the button is of a first type for items of the first menu (MN1) and the button is of a second type for items of the second menu (MN2), said first type and said second type being different from one another, said button being automatically updated upon detection of the second input when said second input involves the click action performed on said specific portion; and wherein, in the second menu (MN2), the button of the first type for items of the first menu (MN1) is displayed alongside with the items of the first menu (MN1) as long as the items of the first menu (MN1) are displayed, and the button of the second type for items of the second menu (MN2) are displayed alongside with the items of the second menu (MN2) as long as the items of the second menu (MN2) are displayed.

6. A non-transitory computer-readable data-storage medium (M1-M4) comprising:
a memory area containing computer-executable instructions (EXP) that cause a computer system to select and activate an item from a list by:

a) receiving a first input from a user, the first input being provided by the user through a pointing device (PD) and the first input comprising an interaction with an icon (IC) displayed on a computer screen (DY), said interaction involving either a press action performed on the icon using said pointing device or a double click on the icon using said pointing device;

b) if the first input involves the press action, displaying on the computer screen a first menu (MN1) comprising a subset of the items of the list; otherwise, if the input involves the double click, displaying on the computer screen a second menu (MN2) comprising the whole list of items; and c) selecting and activating an item (ITn, ITm) of the displayed menu upon receiving a second input from the user;

wherein step c) comprises detecting whether the second input involves either a click action performed by the user on any point of the item to be selected except on a specific portion thereof, or a click action performed by the user on said specific portion, the computer-executable instructions (EXP) further including instructions that cause the computer system, (i) responsive to the second input involving the click action performed on said specific portion and the item being of the second menu, to add said item to the subset of items of the first menu in addition to activating the item, and (ii) responsive to the second input involving the click action performed on any point of the item to be selected except on said specific portion thereof, and the item being of the second menu, to activate the item without adding it to the subset of items of the first menu;

wherein the specific portion is a predetermined region (ST) of the item to be selected and said predetermined region (ST) comprises a button, where the button is of a first type for items of the first menu (MN1) and the button is of a second type for items of the second menu (MN2), said first type and said second type being different from one another, said button being automatically updated upon detection of the second input when said second input involves the click action performed on said specific portion; and wherein, in the second menu (MN2), the button of the first type for items of the first menu (MN1) is displayed alongside with the items of the first menu (MN1) as long as the items of the first menu (MN1) are displayed, and the button of the second type for items of the second menu (MN2) are displayed alongside with the items of the second menu (MN2) as long as the items of the second menu (MN2) are displayed.

7. A computer system comprising:
a processor (P) coupled to a memory (M1-M4) and to graphical user interface devices (KB, PD, DC, DY), the memory storing computer-executable instructions (EXP) that cause the computer system to select and activate an item from a list by:

a) receiving a first input from a user, the first input being provided by the user through a pointing device (PD) and the first input comprising an interaction with an icon (IC) displayed on a computer screen (DY), said interaction involving either a press action performed on the icon using said pointing device or a double click on the icon using said pointing device;

b) if the first input involves the press action, displaying on the computer screen a first menu (MN1) comprising a subset of the items of the list; otherwise, if the input involves the double click, displaying on the computer screen a second menu (MN2) comprising the whole list of items; and c) selecting and activating an item (ITn, ITm) of the displayed menu upon receiving a second input from the user;

wherein step c) comprises detecting whether the second input involves either a click action performed by the user on any point of the item to be selected except on a specific portion thereof, or a click action performed by the user on said specific portion, the computer-executable instructions (EXP) further causing the computer system, (i) responsive to the second input involving the click action performed on said specific portion and the item being of the second menu, to add said item to the subset of items of the first menu in addition to activating the item, and (ii) responsive to the second input involving the click action performed on any point of the item to be selected except on said specific portion thereof, and the item being of the second menu, to activate the item without adding it to the subset of items of the first menu;

wherein the specific portion is a predetermined region (ST) of the item to be selected and said predetermined region (ST) comprises a button, where the button is of a first type for items of the first menu (MN1) and the button is of a second type for items of the second menu (MN2), said first type and said second type being different from one another, said button being automatically updated upon detection of the second input when said second input involves the click action performed on said specific portion; and wherein, in the second menu (MN2), the button of the first type for items of the first menu (MN1) is displayed alongside with the items of the first menu (MN1) as long as the items of the first menu (MN1) are displayed, and the button of the second type for items of the second menu (MN2) are displayed alongside with the items of the second menu (MN2) as long as the items of the second menu (MN2) are displayed.

8. The computer system as claimed in claim 7, wherein the first and second menu are displayed on a same region of the computer screen, adjacent to or overlapping the icon.

9. The computer system as claimed in claim 7, wherein:
when the first menu is displayed, said selecting and activating an item comprises a drag and release action performed on the item to be selected using said pointing device.

10. The computer system as claimed in claim 7, wherein the click action performed by the user on any point of the item to be selected except the specific portion thereof and the click action performed by the user on said specific portion are performed using said pointing device.

* * * * *